(12) United States Patent
Loertscher et al.

(10) Patent No.: US 9,753,309 B2
(45) Date of Patent: Sep. 5, 2017

(54) CONTACT LENS AND METHOD FOR PREVENTION OF MYOPIA PROGRESSION

(71) Applicants: Martin Loertscher, Auckland (NZ); John R. Phillips, Auckland (NZ)

(72) Inventors: Martin Loertscher, Auckland (NZ); John R. Phillips, Auckland (NZ)

(73) Assignee: MYOPIAOK LIMITED, Auckland (NZ)

(*) Notice: Subject to any disclaimer, the term of this patent is extended or adjusted under 35 U.S.C. 154(b) by 57 days.

(21) Appl. No.: 14/532,459

(22) Filed: Nov. 4, 2014

(65) Prior Publication Data

US 2015/0124212 A1    May 7, 2015

Related U.S. Application Data

(60) Provisional application No. 61/899,459, filed on Nov. 4, 2013.

(51) Int. Cl.
*G02C 7/04* (2006.01)

(52) U.S. Cl.
CPC ......... *G02C 7/047* (2013.01); *G02C 2202/24* (2013.01)

(58) Field of Classification Search
CPC . G02C 7/02; G02C 7/04; G02C 7/041; G02C 7/042; G02C 7/0471; G02C 7/047; G02C 2202/04

USPC .......... 351/159.78, 159.79, 159.23
See application file for complete search history.

(56) References Cited

U.S. PATENT DOCUMENTS

| | | | | |
|---|---|---|---|---|
| 2008/0062380 A1* | 3/2008 | Phillips | .................. | G02C 7/027 351/159.05 |
| 2009/0303442 A1* | 12/2009 | Choo | .................... | G02C 7/047 351/246 |
| 2010/0328604 A1* | 12/2010 | Collins | .................... | G02C 7/04 351/159.06 |

* cited by examiner

*Primary Examiner* — Darryl J Collins
*Assistant Examiner* — Journey Sumlar
(74) *Attorney, Agent, or Firm* — Young & Thompson

(57) ABSTRACT

A method of slowing the progression of myopia in a person, comprises applying to the eye of the person a contact lens or lenses to mold the surface of the cornea. On removal of the lens, the shape of the corneal surface includes a vision correction area for correcting the myopic vision of the person, and a myopic defocus area having a more positive power and located within the pupil area, to simultaneously present a controlled myopic defocus to the retina both when viewing in the distance and also when viewing at near, without the lens in place on the cornea. Contact lenses and their use are also claimed.

18 Claims, 3 Drawing Sheets

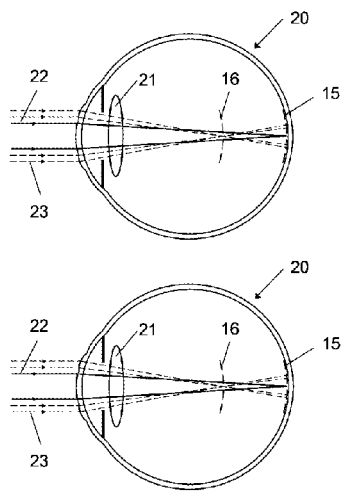
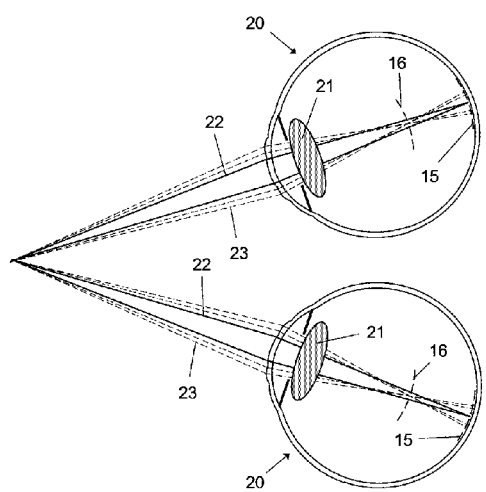
Figure 2A
Figure 2B
(2A) Both Eyes viewing a distant object with the crystalline lens (21) of the eye in the un-accommodated state.
(2B) Both eyes converging and the crystalline lens (21) accommodating to view a near object.

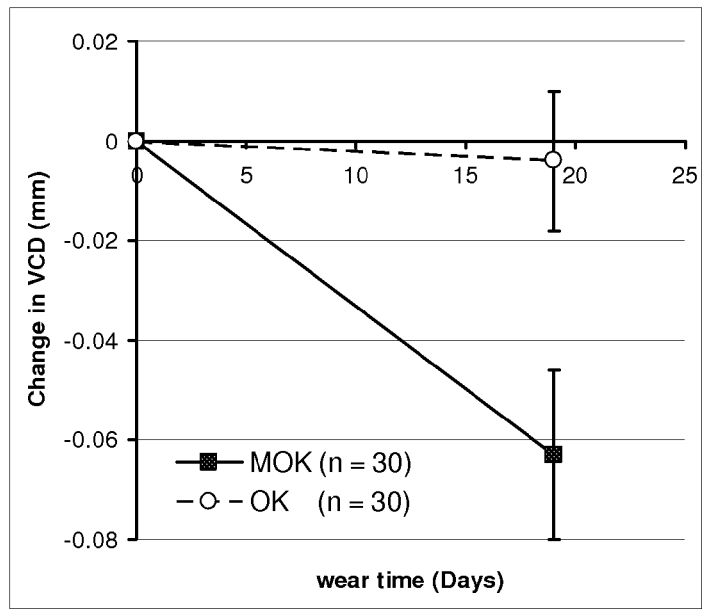
Figure 3A: Change in VCD after 19 days overnight wear-time (30 participants)
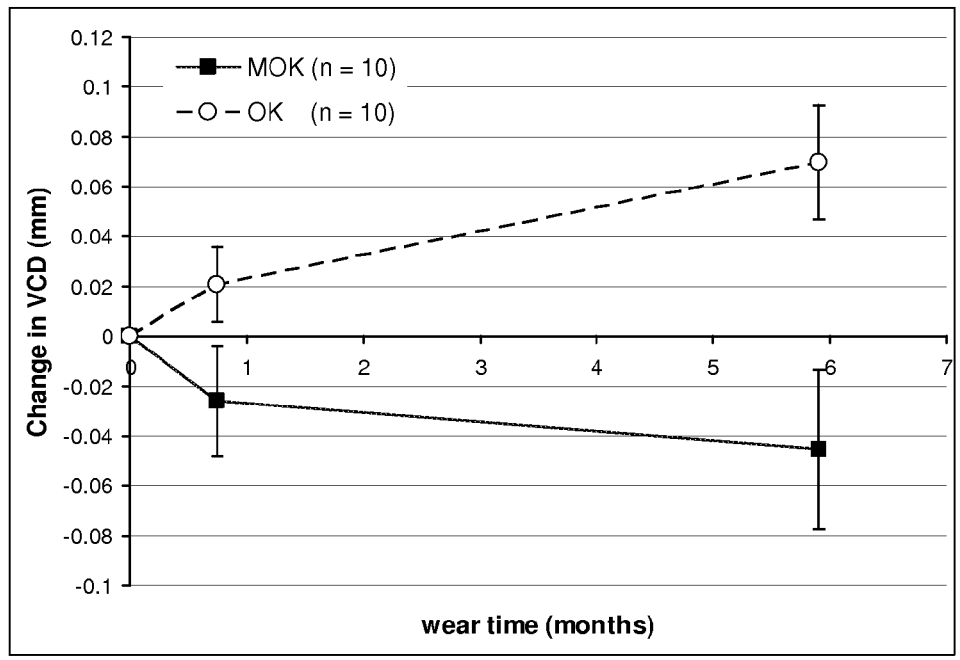
Figure 3B: Change in VCD after 6 months overnight wear-time (10 participants)

CONTACT LENS AND METHOD FOR PREVENTION OF MYOPIA PROGRESSION

FIELD OF INVENTION

The invention relates to a contact lens and method for prevention of myopia progression.

BACKGROUND

Myopia (short-sight) is a common ocular condition in which distant objects appear blurred whereas near objects are seen clearly. The prevalence of myopia, which is about 25% in developed countries and may be 70-80% in parts of Asia, has significant socioeconomic and public health consequences. Even people with relatively low degrees of myopia usually require an optical correction (e.g. spectacles or contact lenses) to allow them to drive a car or see the school blackboard, whereas those with high myopia also have an increased risk of developing blinding conditions such as retinal detachment and glaucoma. Myopia often develops during childhood and typically increases in severity (requiring progressively stronger spectacles to correct it) until early adulthood, although the final amount of myopia that develops will vary between individuals.

Myopia is generally characterised by an abnormal enlargement of the eye-ball which has the effect of moving the light-sensitive tissue (the retina in the back of the eye) out of the focal plane of the optical components of the eye. Thus, images of distant objects are brought to focus in front of the retina, rather than in the plane of the retina. Images of distant objects are therefore seen as blurred. In high levels of myopia, the marked enlargement of the eye-ball also results in a stretching of the retina and its associated blood supply, which renders the eye more susceptible to retinal detachment, glaucomatous damage and degenerative myopic retinopathy.

The aetiology of myopia is poorly understood. Both genetic and environmental factors have been implicated and in susceptible individuals myopia progression is thought to be associated with excessive near work (e.g. reading), possibly because the prolonged muscular effort of focussing the eyes at near (accommodation) results in a lag of accommodation (insufficient accommodation) and hyperopic retinal defocus. The correction of myopia requires minus-powered lenses which demand a greater accommodative effort for near work than is required without the lenses. This greater effort (and thus greater accommodative lag) has been implicated in exacerbating myopia progression and attempts have been made to reduce it by prescribing bifocal spectacles or Progressive Addition Lenses (PALs). Most evidence indicates that if bifocals/PALs slow myopia progression compared to conventional lenses, then it is only by a small amount. A variety of other methods have been used in attempts to slow myopia progression (eg vision therapy, distance under-correction and biofeedback training) but there is no convincing evidence that myopia progression is reduced by these procedures. In one recent study (Chung, Mohidin & O'Leary, Undercorrection of myopia enhances rather than inhibits myopia progression, Vision Research, 42 (2002) 2555-2559) 47 children had their myopia undercorrected by 0.75 D (which reduced their distance vision to 6/12). Over a period of two years, the progression of myopia in these children was shown to be significantly greater than in a control group of children wearing a full conventional correction. They concluded that myopic defocus speeds up myopia development in already myopic children. However, although bilateral under-correction results in myopic retinal defocus for distance viewing, clear retinal images in both eyes are experienced for near viewing. Use of pharmacological agents, in particular atropine eye-drops, to reduce myopia progression has been investigated in several studies and recent trials have provided evidence that repeated instillation of atropine may be effective in reducing myopia progression. However, myopia typically progresses over a number of years. The prospect of applying drug therapies long-term to large numbers of healthy children poses significant problems in relation to drug toxicity and other unwanted side effects.

Animal studies have demonstrated that the normal developing eye grows in a co-ordinated manner so that the length of the eye matches the power of its optical components, resulting in emmetropia (no refractive error). Furthermore, when a lens is placed in front of a developing animal's eye, the eye alters its growth in such a way as to compensate for the imposed defocus. Over time, the eye adjusts its axial dimensions to achieve functional emmetropia with the lens in place. Thus, eyes that have worn minus lenses (initially causing hyperopic retinal defocus, with images focused behind the retina) become elongated and are thus myopic on lens removal. Eyes that have worn plus lenses (causing myopic retinal defocus, with images focussed in front of the retina) are shortened and are thus hyperopic (long sighted) on lens removal. Such compensatory responses to defocusing lenses have been demonstrated in several species, ranging from chick to monkey.

U.S. Pat. Nos. 7,766,478, 7,832,859, and 7,997,725 disclose contact lenses including on the anterior surface of the lens a vision correction area for correcting in use the myopic vision of a wearer. The contact lenses also include a myopic defocus area for simultaneously in use presenting a myopic defocused image to the wearer at all levels of accommodation (i.e. when the wearer is viewing in the distance and also when viewing at near). The contact lenses and method disclosed in U.S. Pat. Nos. 7,766,478, 7,832,859, and 7,997,725 are aimed at slowing myopia progression by correcting pre-existing myopia (allowing the wearer to see distant objects clearly, as a normal contact lens), while also applying the controlled myopic defocus to the retina, while the lens is worn on the eye.

SUMMARY OF INVENTION

In broad terms in one aspect the invention comprises a contact lens comprising a posterior surface of the lens shaped to mould the corneal surface over time, for example overnight, so that when the lens is removed, some parts of the moulded shape of the corneal surface correct the myopic vision of a person (vision correction areas), and other parts comprise myopic defocus areas for simultaneously presenting a myopic defocused image to the person, while the lens is not being worn, at all levels of accommodation.

In broad terms in another aspect of the invention comprises a method of treating or slowing the progression of myopia in a person, which includes applying to the eye(s) of the person or prescribing for the person, a contact lens or lens(es) each comprising a posterior surface of the lens shaped to mould the corneal surface over time, so that when the lens is removed some parts of the cornea are moulded to a shape to correct the myopic vision of a person, and other parts are moulded to a shape comprising a myopic defocus area which simultaneously presents a myopic defocused image to the person, while the lens is not being worn.

The contact lens and method of the invention are aimed at slowing myopia progression in humans, in particular in children and young adults. The lens is intended to mould the cornea of a person so that on removal of the lens the corneal surface includes an area that corrects preexisting myopia (allowing the wearer to see distant objects clearly without the aid of a correcting lens), while also including a myopic defocus area or 'treatment zone' which applies a controlled myopic defocus to the central retina both when the person is viewing in the distance and also when viewing at near, in order to slow the progression of myopia. A focussed retinal image and a myopic defocused retinal image during both distance and near viewing are simultaneously presented to the eye(s) of the person by the shape of the corneal surface which has been moulded by the lens.

This invention provides a new means and method for treating myopia progression in people with myopia with contact lenses having a posterior surface which moulds the cornea to a shape which, on removal of the lens, both corrects their myopic refractive error and simultaneously provides an optical treatment to slow the progression of myopia. The optical treatment consists of continuous myopic retinal defocus which is created by the shape of the cornea that has been moulded by the lens of the invention, both during distance viewing and also during near viewing.

The invention also includes use, in the manufacture of a contact lens system or kit for treating or slowing the progression of myopia in a patient, of two or more contact lenses which may be the same or different, at least one of which moulds the cornea such that on removal of the lens, the cornea includes a vision correction area for correcting the myopic vision of the patient and a myopic defocus area for simultaneously presenting a myopic defocused image to the patient.

The invention also includes a method of moulding the cornea to a shape which corrects myopic vision while causing functional emmetropia in a person, which includes applying to at least one of the person's eyes a contact lens with a posterior surface which moulds the cornea to a shape including a vision correction area for correcting the myopic vision of the person and a myopic defocus area for simultaneously presenting a myopic defocused image to the person, when the lens of the invention is removed.

The invention also includes use of a contact lens to mould the cornea to a shape which includes a vision correction area for correcting the myopic vision of a person and a myopic defocus area for simultaneously presenting a myopic defocused image to the person, for the technical purpose of correcting the person's myopic vision causing functional emmetropia on removal of the contact lens from the person's eye.

BRIEF DESCRIPTION OF THE FIGURES

The invention is further described with reference to the accompanying drawing FIG. 1, by way of example and without intending to be limiting, in which:

FIG. 2A: Shows a cross-section (in plan view) through two eyes viewing a distant object with the crystalline lens (21) of the eye in the un-accommodated state, with ciliary muscle (not shown) relaxed.

FIG. 2B: Shows both eyes of FIG. 2A converging and focussing (accommodating) on a near object, with the crystalline lens (21) of the eye now in the accommodated state, caused by contraction of the ciliary muscle (not shown).

FIG. 3A: Shows change in vitreous chamber depth (VCD) after 19 days of overnight wear of contact lenses for 30 participants. Dashed line shows little change in VCD in eyes wearing conventional OK lenses. Solid line shows significant reduction in VCD in eyes wearing the lens of the invention (MOK lens) after 19 days of overnight wear. Error bars show ±1 SEM.

FIG. 3B: Shows change in vitreous chamber depth (VCD) after 6 months of overnight wear of contact lenses for 10 participants. Dashed line shows change in VCD in eyes wearing conventional OK lenses. Solid line shows change in VCD in eyes wearing the lens of the invention (MOK lens). After 6 months of overnight wear the mean VCD (n=10) of the eyes wearing MOK lenses is significantly shorter than in eyes wearing conventional OK lenses (P=0.017).

DETAILED DESCRIPTION OF PREFERRED FORMS

Figure 1A:
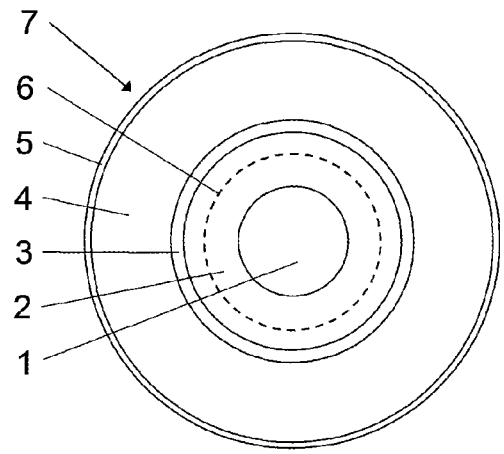
FIG. 1A shows a posterior (back) view of one form of the lens of the invention, showing the following features:
1 A central moulding zone for moulding a central vision correction zone 10 on the surface of the cornea.
2 A moulding zone for moulding a treatment zone (11) on the surface of the cornea.
3 A reverse geometry zone.
4 An alignment zone.
5 A peripheral zone.
6 Position of a typical pupil margin.
7 The lens of the invention
Figure 1B:
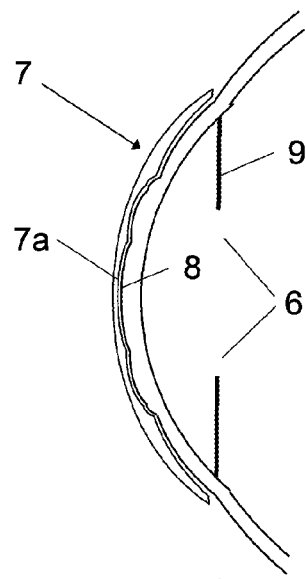
FIG. 1B shows a side (section) view of one form of the lens of the invention, while in use for moulding the anterior surface of the cornea into a vision correction zone and a treatment zone, showing:
7 The lens of the invention
7a Posterior surface of the lens of the invention.
8 Anterior surface of the cornea.
9 Iris of the eye.
6 Pupil of the eye.
Figure 1C:
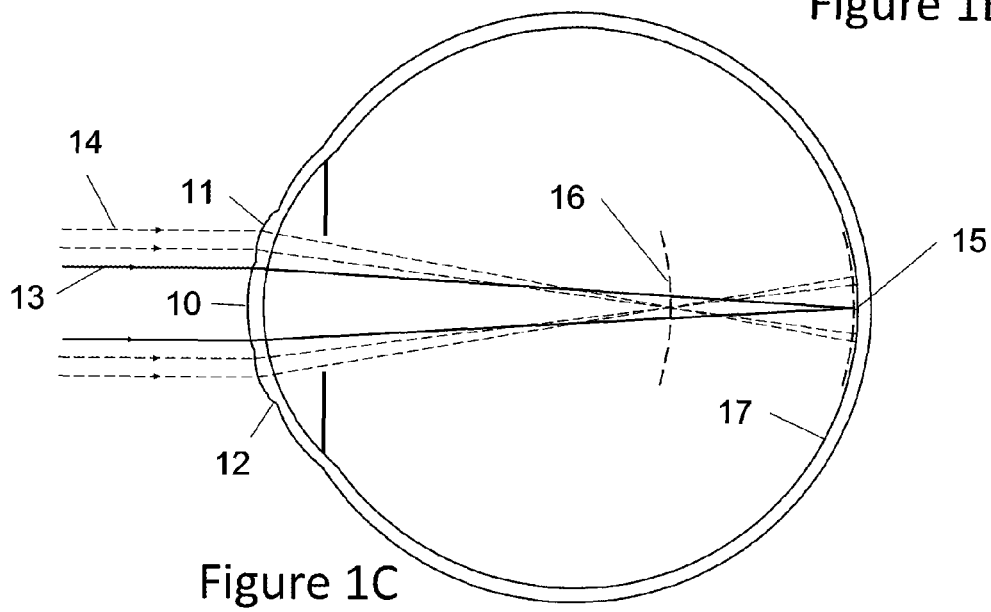
FIG. 1C shows a cross-section through an eye following the use of the lens of the invention to mould the cornea, showing:
10 The anterior surface of the cornea moulded into a central vision correction zone.
11 The anterior surface of the cornea moulded into a treatment zone.
12 Corneal reverse geometry zone.
13 Parallel light rays passing through the vision correction zone of the cornea and forming a focal plane 15 located on, or close to the retina 17, to provide clear vision to the person.
14 Parallel light rays passing through the treatment zone of the cornea and forming a focal plane 16 located anterior to the retina, to create myopic defocus on the retina.

Referring to FIGS. 1A to 1C, a contact lens 7 according to one embodiment of the invention has a posterior surface 7a which has a specific contour as will be described further below. When the lens 7 is placed on the eye of a wearer, the posterior surface 7A has the effect of reshaping the anterior corneal surface 8 of the eye. In use, the reshaping can occur gradually over time.

The posterior surface 7A is contoured to include a vision correction moulding zone 1 and a vision treatment moulding zone 2, which in the example shown surrounds the vision correction moulding zone 1. The posterior surface 7A also includes a reverse geometry zone 3, an alignment zone 4, and a peripheral zone 5. The position of a typical pupil margin of a wearer is shown by broken line 6 in FIG. 1A.

The vision correction moulding zone 1 has a curvature that is defined by its base-curve. The base-curve has a radius that is longer than the radius of the anterior corneal surface before the lens of the invention is applied. The base-curve radius depends on the amount of refractive error that has to be corrected and the baseline radius of the anterior corneal surface 8 before moulding. The vision correction moulding zone 1 on the posterior surface of the lens of the invention moulds a central vision correction area 10 onto the anterior corneal surface on which it is located. The vision correction area 10 on the cornea is moulded so that when the lens 7 of the invention is removed, light rays 13 passing through this correction area of the cornea will converge to a focal plane 15 on or near the retina, to give clear vision.

The vision treatment moulding zone 2 of the lens of the invention moulds the part of the corneal surface on which it is located to provide a vision treatment area 11 on the corneal surface. In the example shown, the vision treatment area 11 is adjacent to the central vision correction area 10. Zone 2 of the lens has a shorter base-curve radius than that of the vision correction zone 1. Therefore the treatment area 11 moulded onto the cornea by zone 2 of the lens has a more positive optical power than the vision correction area 10. It is possible that the treatment area 11 may be up to 5 Dioptres more positive in focal power than the correction area 10, more likely between 1 and 3 Dioptres more positive, and typically about 2 Dioptres more positive in focal power than the vision correction area. Because of this difference, when the lens 7 is removed, light rays 14 passing through the corneal vision correction area 11 will converge to a focal plane 16 in front of the retina 17 and expose the retina to myopic defocus. Thus area 11 comprises a myopic defocus area.

Both the central corneal vision correction area 10 and the myopic defocus area 11 are moulded on the anterior surface of the cornea so that light rays passing through them also pass through the pupil 6, causing the retina 17 to be exposed to a clear retinal image and simultaneously to myopic defocus to slow myopia progression.

Referring to FIG. 2A, eyes 20 are shown in viewing a distant object with the crystalline lens 21 of the eye in the un-accommodated state, with ciliary muscle (not shown) relaxed. Parallel light rays 22 passing through the vision correction area 10 of the cornea create a focal plane 15 located on, or close to the retina, to provide clear vision to the person. Parallel light rays 23 passing through the treatment area 11 of the cornea form a focal plane 16 located anterior to the retina, to create myopic defocus on the retina. In order to view a near object, the eyes 20 will converge (as shown diagrammatically in FIG. 2B) and accommodate. Accommodation is brought about by constriction of the ciliary muscle. This alters (increases) the optical power of the crystalline lens of the eye to bring the image transmitted through the correction zone into focus on the retina. This accommodation also has the effect of maintaining a simultaneous myopic-defocused retinal image created by light passing through the treatment zone of the lens (FIG. 2B). Thus light rays 22 from the near object passing through the vision correction zone of the cornea create a focal plane 15 located on, or close to the retina, to provide clear vision to the person. Light rays 23 from the near object passing through the treatment zone of the cornea still form a focal plane 16 located anterior to the retina, to create myopic defocus on the retina.

All zones of the lens of the invention are located on the posterior (back) surface of the lens. The shape of the anterior (front) surface of the lens of the invention is not specified. Although it may be shaped so as to correct the refractive error of the wearer, it does not mould the cornea.

The invention is not limited to particular shapes or locations of the vision correction and vision treatment zones 1 and 2 on the lens or lenses. Zones 1 and 2 may each make up any part of the area of the lens, provided that the net result is that the lens will mould the cornea into a shape that simultaneously presents to the person a clear retinal image and myopic defocus during both distance and near viewing. The lenses shown and the shapes of the correction and treatment areas are given by way of example only.

The reverse zone 3 is located between the moulding zone 2 and the alignment zone 4. This reverse zone is a common feature of current reverse-geometry conventional overnight orthokeratology (OK) lens designs. During the moulding process in conventional OK lenses it provides a volume into which tissue displaced during flattening of the central optic zone, can move. The reverse zone of a conventional OK lens design has a radius of curvature that is shorter than that of the central optic zone. It has been shown that one side-effect of this zone is to create myopic defocus in the peripheral retina, but not in the central retina and it has been proposed that this peripheral defocus may account for the slowing of myopia progression with conventional OK lens treatment. However, the reverse zone in a conventional OK lens and the reverse zone 3 in the lens of the invention do not have an on-axis optical treatment effect because reverse zones are normally positioned outside the pupil area 6 when moulded on the corneal surface. Thus, the reverse zone 3 of the lens of the invention may create off-axis myopic defocus equivalent to that for conventional OK lenses, but not an on-axis optical treatment effect.

The parameters of the alignment zone 4 may be selected so as to stabilise and centre the lens of the invention on the cornea during corneal moulding. The peripheral zone 5 may be adjusted to provide sufficient tear exchange beneath the lens. The characteristics of the reverse zone 3, the alignment zone 4 and peripheral zone 5 may be adjusted in order to achieve a satisfactory fit of the lens of the invention to the cornea during corneal moulding.

The Effect on the Eye Over Time

Conventional overnight orthokeratology (OK) lenses mould the corneal epithelium (the surface layer of the cornea) into a flatter shape in order to correct the refractive error of the wearer. On removal of the lenses, the wearer experiences clear unaided vision during the day, as long as they regularly wear the lenses at night. In addition to correcting the refractive error, conventional OK has been reported to slow myopia progression in children (Cho, Cheung et al. 2005; Walline, Jones et al. 2009; Kakita, Hiraoka et al. 2011; Hiraoka, Kakita et al. 2012) compared to myopia progression in children wearing spectacles or conventional soft contact lenses.

In the study described in detail below, we have tested the myopia-inhibiting effect of the lens of the invention, herein referred to as the Modified Orthokeratology (MOK) lens compared to the conventional orthokeratology (OK) lens. We provide evidence that the lens of the invention (MOK lens) significantly slows myopia progression (as measured by increase in vitreous chamber depth over time) compared to myopia progression in eyes fitted with conventional OK lenses.

Methods

Ethics approval for this trial was obtained from the New Zealand Health Research Council Lower South Ethics Committee and the trial was prospectively registered with the Australian New Zealand Clinical Trial Register (anzctr.org).

Written consent from parents and assent from children was obtained after explaining the trial to the participants and their parents. All participants were initially examined to ensure that no contraindications existed to wearing orthokeratology lenses.

Participants were 30 children (20 female, 10 male, aged 10-14 years, mean age±1 Standard Deviation (SD) =12.3±1.3 years) with a spherical equivalent refractive error (SER) of −2.71±0.76 D (range −1.25 to −4.00 D). Sixteen of the children were of East-Asian ethnicity and fourteen were NZ-European. Inclusion criteria were (i) ten to fourteen years of age (ii) progression of myopia in the previous year of at least −0.50 D and no ocular pathology or any binocular vision problems (iii) both eyes having subjectively determined best-sphere refraction between −1.25 D to −4.00 D with corneal astigmatism ≤1.50 D and anisometropia <1.00 D (iv) best corrected visual acuity measured with a high-contrast Snellen chart of at least 6/6. Participants were pseudo-randomly divided into two groups (A and B) using a permuted block design with a random block size of four or six. Randomisation was stratified by gender and ethnicity (East Asian and Non-East Asian including NZ European, Indian and Maori/Pasifika). Children assigned to Group A wore the MOK lens in the dominant eye and children in Group B wore the MOK lens in the non-dominant eye. In each group, a conventional OK lens was worn in the contralateral eye as the control.

Both MOK and OK lenses mould the cornea and abolish the measured refractive error by flattening the cornea. Thus, myopia progression cannot readily be measured by change in refraction over time, as is the case in studies investigating spectacles or conventional contact lenses. Therefore, in the present study, as in other such studies (e.g. Cho, Cheung et al. 2005), myopia progression was monitored over time by periodic measurements (outcome measures) of the vitreous chamber depth (VCD) and the axial eye length (AXL) in the two eyes. To determine VCD, ocular components including central cornea thickness (CCT), anterior chamber depth (AD), crystalline lens thickness (LT), axial eye length (AXL) and choroidal thickness (CHR) were accurately measured using low-coherence reflectometry (Lenstar 900, Haag Streit, Switzerland). The value for VCD was computed as VCD=(AXL−LT−AD−CCT). In addition, we monitored visual performance of both eyes including visual acuity, stereopsis, low contrast sensitivity and accommodation.

To test the efficacy of the MOK lens design in slowing myopia progression, we compared VCD and AXL elongation over time between the eyes wearing conventional OK lenses overnight and those wearing MOK lenses overnight. The treatment zone 2 (FIG. 1A) of the MOK lenses used in this study were chosen to mould the corneal treatment area 11 to be +2.50 Dioptres more positive than the central corneal vision correction area 10.

Results:

Before lens fitting there were no statistical differences (paired t-tests) in Baseline refractive error, vitreous chamber depth (VCD) or axial eye length (AXL) between eyes assigned to overnight MOK lens wear or overnight OK lens wear (mean±1 SD, Refractive error: MOK=−2.73±0.74 D vs OK=−2.69±0.79 D, P=0.56; VCD: MOK=17.36±0.82 mm vs OK=17.35±0.80 mm, P=0.45; AL: MOK=24.50±0.77 mm vs OK 24.46±0.78 mm, P=0.132, n=30). Baseline measures were performed before lenses were prescribed.

Data at 19 Days for 30 Participants:

For each eye, the change in VCD (or AXL) over the first 19 days of overnight lens wear was computed by subtracting the baseline value of VCD (or AXL) from the value at 19 days. A negative result corresponds to a shortening in VDC or AXL, whereas a positive value indicates an increase in VCD or AXL. During the first 19 days of overnight lens wear (FIG. 3A), the mean VCD of the eyes assigned to wear MOK lenses became significantly shorter, with mean change in VCD=−0.063±0.09 mm, P=0.001, n=30, see FIG. 3A. In contrast, in the eyes assigned to wear conventional OK lenses, the change in VCD over this period was not significant, i.e. mean change in VCD=−0.004±0.07 mm, P=0.766, n=30. Moreover, in this 19 day period, axial eye length (AXL) in eyes wearing MOK lenses became significantly shorter (−0.083±0.10 mm, P=0.0002), whereas for eyes wearing conventional OK lenses there was no significant change in AXL (−0.018±0.08, P=0.235).

Data at 6 Months for 10 Participants:

Currently 10 participants in the study have completed 6 months of overnight lens wear. At Baseline, there was no significant difference in VCD (or AXL) between eyes assigned to wear conventional OK lenses and those assigned to wear MOK lenses (P=0.801 and 0.863 respectively). After the first 6 months of overnight lens wear (FIG. 3B), the mean VCD of the eyes assigned to wear MOK lenses was significantly shorter than the mean VCD of eyes assigned conventional OK lenses (P=0.017). Moreover, in this 6 month period, mean axial eye length (AXL) in eyes wearing MOK lenses became significantly shorter than mean AXL of eyes wearing conventional OK lenses (P=0.018).

Conclusions:

Unexpectedly, in 30 children, the vitreous chamber depth in eyes assigned to wear the lens of the invention (MOK lens) became significantly shorter compared to baseline, within 19 days of commencing overnight wear. In contrast, the vitreous chamber depth in the contralateral eyes of the same children, which were assigned to wear conventional OK lenses, did not change by a significant amount. Moreover, in this 19 day period, axial eye length in eyes assigned to wear MOK lenses became significantly shorter, whereas for eyes assigned to wear conventional OK lenses, there was no significant change in axial eye length.

Furthermore, in the 10 children who wore lenses overnight for 6 months, the mean vitreous chamber depth and mean axial eye length in the eyes assigned to wear the lens of the invention (MOK lens) were significantly shorter than the vitreous chamber depth and axial eye length in eyes assigned to wear conventional overnight OK lenses.

The method and contact lens of the invention moulds the cornea so that when the lens of the invention is removed, the shape of the moulded cornea corrects the refractive error of the eye. In addition, the lens of the invention also moulds the cornea to a zone that applies continuous myopic retinal defocus whether the person is viewing in the distance or at near. The effect of overnight wear of the contact lens of the invention is that when the lens is removed, the myopic retinal defocus created by the moulded cornea inhibits the abnormal axial elongation of the eye that underlies myopia progression with the effect that over time, the progression of myopia slows, stops or reverses. The manifestations of the effect are (i) the progressive abnormal enlargement of the eye ceases, although depending on the age of the wearer, normal eye enlargement (growth) may still occur. (ii) the progressively increasing myopic refractive error, requiring progressively stronger minus power lenses to correct it, slows its rate of progression or ceases to progress.

The foregoing describes the invention including preferred forms thereof. Alternations and modifications as will be obvious to those skilled in the art are intended to be incorporated therein as defined in the accompanying claims.

The invention claimed is:

1. A method of treating or slowing the progression of myopia in a person, comprising:
applying to the eye or eyes of the person or prescribing for the person, a contact lens or lenses,
each contact lens including a posterior surface contoured to reshape the anterior corneal surface of the eye to which the lens is applied,
the posterior surface being configured to reshape the corneal surface such that the cornea includes a vision correction area for correcting the myopic vision of the person, and a vision treatment area which presents a myopic defocused image to the central retina of the person, to thereby simultaneously present the eye or eyes of the person a clear retinal image and retinal myopic defocus when the lens or lenses are not being worn.

2. The method according to claim further comprising applying the contact lens or lenses periodically to reshape the corneal surface over time.

3. The method according to claim further comprising applying the contact lens or lenses repetitively for a selected time period.

4. The method according to claim 1 further comprising the person applying the lens or lenses overnight.

5. The method according to claim 1 wherein the clear retinal image and retinal myopic defocus is simultaneously presented to the eye or eyes of the person during both distance and near viewing.

6. The method according to claim 1 further comprising reshaping the corneal surface by moulding the corneal surface over time to the contour posterior surface.

7. The method according to claim 1 further comprising applying to the eye(s) of the person or prescribing for the person, a contact lens or lens(es) which reshape the corneal surface to provide a focal power of the treatment area of up to 5 dioptres more positive than the focal power of the vision correcting area.

8. The method according to claim 1 further comprising applying to the eye(s) of the person or prescribing for the person, a contact lens or lens(es) which reshape the corneal surface to provide the focal power of the treatment area of between about 1 and about 3 dioptres more positive than the focal power of the vision correcting area.

9. The method according to claim 1 further comprising applying to the eye(s) of the person or prescribing for the person, a contact lens or lens(es) which reshape the corneal surface to provide the focal power of the treatment area of about 2 dioptres more positive than the focal power of the vision correcting area.

10. The method according to claim 1 further comprising applying to the eye(s) of the person or prescribing for the person, a contact lens or lens(es) having a vision correction zone for providing the vision correction area, and a vision treatment zone for providing the vision treatment area, and in which the vision correction zone is provided substantially near the centre of the lens and the vision treatment zone substantially surrounds the vision correction zone.

11. A contact lens comprising a posterior surface contoured to reshape the anterior corneal surface of the eye to which the lens is applied, the posterior surface being configured to reshape the corneal surface such that the cornea includes a vision correction area for correcting the myopic vision of the person, and a vision treatment area which presents a myopic defocused image to the central retina of the person, to thereby simultaneously present the eye or eyes of the person a clear retinal image and retinal myopic defocus when the lens or lenses are not being worn.

12. The contact lens according to claim 11 wherein the clear retinal image and retinal myopic defocus is simultaneously presented to the eye or eyes of the person during both distance and near viewing.

13. The contact lens according to claim 11 wherein the vision treatment area has a more positive optical power than the vision correction area to simultaneously present a controlled myopic defocus to the retina both when viewing in the distance and also when viewing at near.

14. The contact lens according to claim 11 wherein the focal power of the treatment area is up to 5 dioptres more positive than the focal power of the vision correcting area.

15. The contact lens according to claim 11 wherein the focal power of the treatment area is between about 1 and about 3 dioptres more positive than the focal power of the vision correcting area.

16. The contact lens according to claim 11 wherein the focal power of the treatment area is about 2 dioptres more positive than the focal power of the vision correcting area.

17. The contact lens according to claim 11 having a vision correction zone for providing the vision correction area, and a vision treatment zone for providing the vision treatment area, and in which the vision correction zone is provided substantially near the centre of the lens and the vision treatment zone substantially surrounds the vision correction zone.

18. Use, in the manufacture of a contact lens system or kit for treating or slowing the progression of myopia in a patient, of two or more contact lenses according to claim 11.

* * * * *